Oct. 22, 1957 — R. E. LONG — 2,810,156
PELLETIZING APPARATUS AND METHOD
Filed May 23, 1956 — 4 Sheets-Sheet 4

INVENTOR
Robert E. Long
BY Beale and Jones
ATTORNEYS

United States Patent Office 2,810,156
Patented Oct. 22, 1957

2,810,156

PELLETIZING APPARATUS AND METHOD

Robert E. Long, Boise, Idaho, assignor to J. R. Simplot Company, Boise, Idaho, a corporation of Nevada Application May 23, 1956, Serial No. 586,700

12 Claims. (Cl. 18—1)

My invention is directed to an improved method and apparatus for pelletizing material.

It is very difficult to compact pulverous material into pellets that will withstand subsequent handling. The general practice has been to agglomerate finely divided material by apparatus of a type such as disclosed in the Rodman U. S. Patent 1,239,221, issued September 4, 1917. In this method of agglomeration finely divided material is fed into a tilted rotating drum and mixed with a certain amount of moisture so that the material rolls on the interior surface of the drum and upon itself to form small pellets.

I have found that finely divided material pelletized according to this method and by this type of apparatus does not form a compact pellet which is adapted to be handled with any facility without breaking down into finely divided material of which it is composed. This is particularly important in the fertilizer industry as well as in other industries. I have developed a method and apparatus for pelletizing finely divided materials such that it is compacted tightly into pellets which withstand subsequent handling without breaking down.

In carrying out my invention the pulverous material is flung out centrifugally with great force and intercepted and moved in a tangential manner to the direction of the centrifugal force following which it is rolled upon itself into pellets. In rolling itself into pellets additional material is collected while forming the pellets and the pellets being formed are held out centrifugally in an intercepted manner while they are rolled. Thus, the direction of the pulverous material is changed and the forces acting thereon are changed in rolling it upon itself while keeping it flung outwardly where it is held in an intercepted manner for rolling.

This method is particularly useful in pelletizing any material where a fairly round compact pellet is desired.

It is an object of my invention to provide an improved method and apparatus for compacting comparatively fine pulverous material into pellets of uniform size and compaction.

Another object of my invention is to provide a method and apparatus for compacting pulverous material without molding and under pressure.

Another object of my invention is to provide a method of applying a centrifugal force to pulverous material and to intercept same so as to move it tangentially and carry it in an intercepted manner so that it will roll upon itself into pellets.

A further object of my invention is to provide an apparatus including a rotating cylinder which rotates upon its axis and orbits about another axis and to provide means for introducing centrifugally pulverous material into the cylinder and to roll same upon itself and collect additional pulverous material thereon to form pellets.

Another object of my invention is to provide a variable speed drive for carrying about in a circular path a cylinder-like member which is mounted for rotation upon its own axis and revolved thereon so as to receive pulverous material and roll same into pellets.

A still further object of my invention is to provide a method of pelletizing material wherein the size and hardness of the pellets can be controlled by varying the moisture content of the material, the centrifugal force applied to the material and the rate of rolling the material along an intercepting surface which rotates in an orbital manner while the material is flung centrifugally thereagainst.

Still further objects and the entire scope of applicability of the present invention will become apparent from the detailed description given hereinafter. It should be understood, however, that the detailed description and specific example is given by way of illustration only and, while indicating a preferred embodiment of the invention, it is not given by way of limitation, since various changes and modifications within the spirit and scope of the invention will become apparent to those skilled in the art from this detailed description.

For a more complete understanding of the nature and scope of my invention reference may be had to the following drawings in which like reference numerals refer to similar parts:

Fig. 8 is an enlarged cross-sectional view along line 8—8 of Fig. 3 showing the central shaft and its associated outer elements.

The pelletizer is generally indicated at 10 and comprises a support frame 11 having four vertical corner legs 12 resting on floor pads 13 with longitudinal angle iron members 14—14 and joining end members 15—15 forming the base. Angle braces 16 further furnish rigidity to the frame 11 which supports the pelletizer proper.

Figure 1:
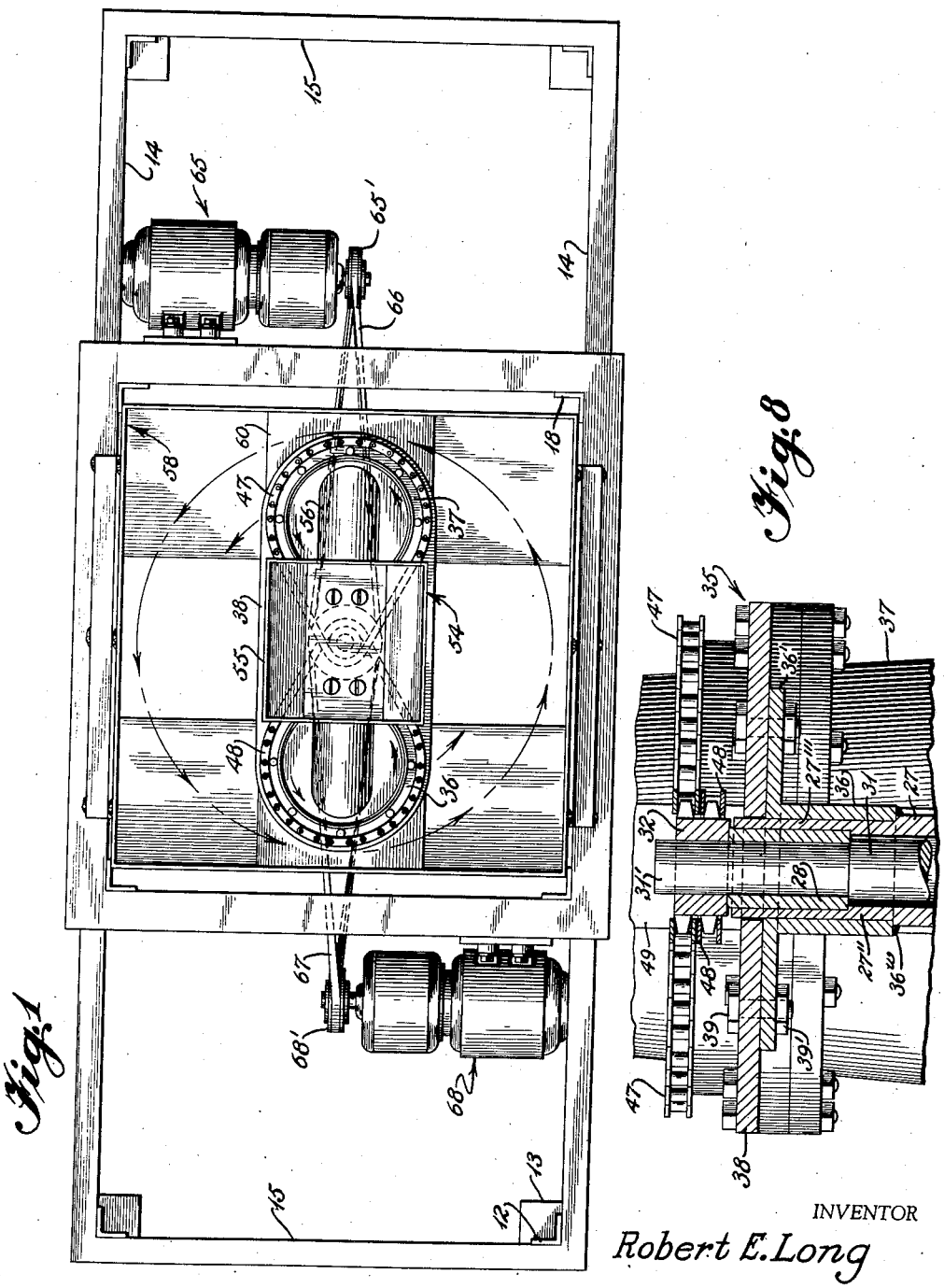
Fig. 1 is a top plan view of the pelletizing apparatus according to my invention.

On the support frame 11 there is mounted a rectangular horizontally disposed channel base box 17 which rests on the longitudinal members 14—14 as best shown in Fig. 1. Extending upward at each corner of the channel base box 17 are vertical posts 18 which form supports for the horizontally disposed and vertically spaced midframe 19 and the horizontally disposed upper frame 20 spaced vertically upward above midframe 19. These members are welded together and form a rigid framework of angle and channel iron for adequate support of the pelletizer to be described.

Figure 3:
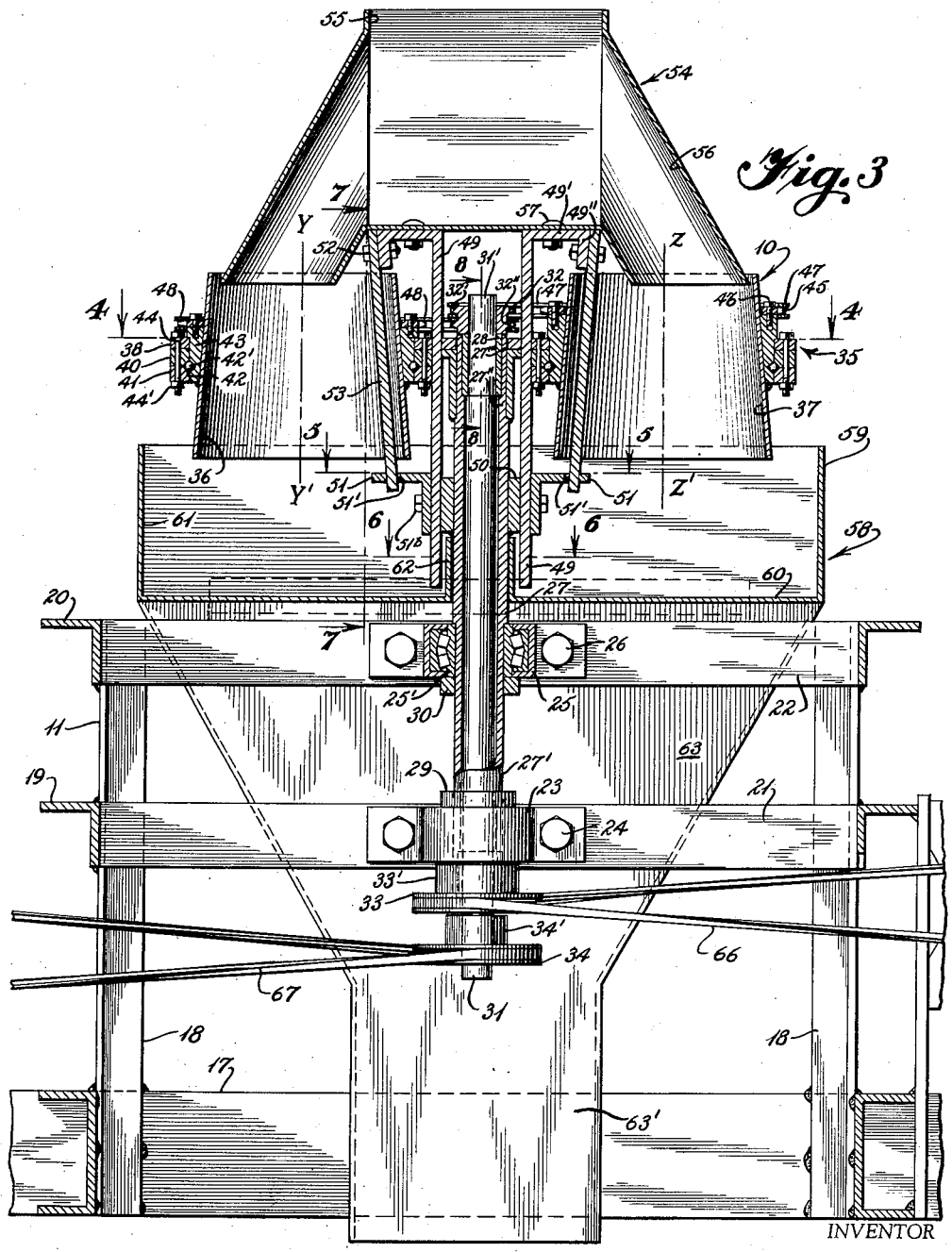
Fig. 3 is a vertical cross-sectional view along line 3—3 of Fig. 2 on an enlarged scale.

In Fig. 3 there is shown a lower transverse angle support 21 for the lower bearing 23. An upper transverse angle support 22 lies in alignment with the upper frame box 20 and serves as a support for the upper bearing 25. Lower bearing 23 is secured to the frame member 21 by bolts 24 having nuts 24' while upper bearing 25 is secured by suitable bolts 26 driving nuts 26'. Upper bearing 25 houses an inner sleeve bearing 25' which acts as a thrust bearing to be described.

Mounted in bearings 23 and 25 is the hollow shaft 27 which extends vertically upward and has a lower reduced portion 27', an upper reduced portion 27" and an extreme upper and reduced inner portion 27'''. The reduced portion 27' as shown in Fig. 3 rides against the inner sleeve 25' of which serves as a thrust support for the hollow shaft 27. Also assisting in the support of lower end of hollow shaft 27 is the collar 29 which rides against the upper surface of bearing 23. An upper thrust collar 30 is also positioned on reduced portion 27' and rides against the lower face of the collar 25'.

Within the hollow shaft 27 there extends a solid shaft 31 having a reduced upper end 31' which is received within bearing sleeve 28 that is in turn received within the extreme upper end 27" of the hollow shaft. Mounted in fixed engagement on the upper end of the vertical shaft 31 is the combined thrust collar and sprocket 32 which assists in supporting the shaft 31 within the hollow shafting 27.

A V-belt pulley 33 is mounted on the lower end of the hollow shaft 27 and is provided with a collar 33' which rides against the lower face of bearing 23. A similar V-belt pulley 34 is attached to the lower end of shaft 31, and it has an integral collar 34' which spaces the pulley portion 34 from the other pulley 33.

The hollow shaft 27 forms a support and drive means for an orbit bracket generally indicated at 35 in Fig. 8 which in the illustration supports two diametrically positioned rotating drums 36 and 37 which are dynamically balanced and rotated individually on their own axes by means of a drive from the central solid shaft 31 to be described.

Orbit bracket 35 includes a sleeve 36 having a top flange 36' which is secured on the reduced upper end 27" of the hollow shaft 27 and attached there by welding as shown at 36w in Fig. 8. Supported on the flanges 36' is a mounting plate 38 having a central aperture which is received over the reduced upper portion 27" of the shaft 27 and secured to the flanges 36' by means of bolts 39 having securing nuts 39' on their bottom ends.

Figure 4:
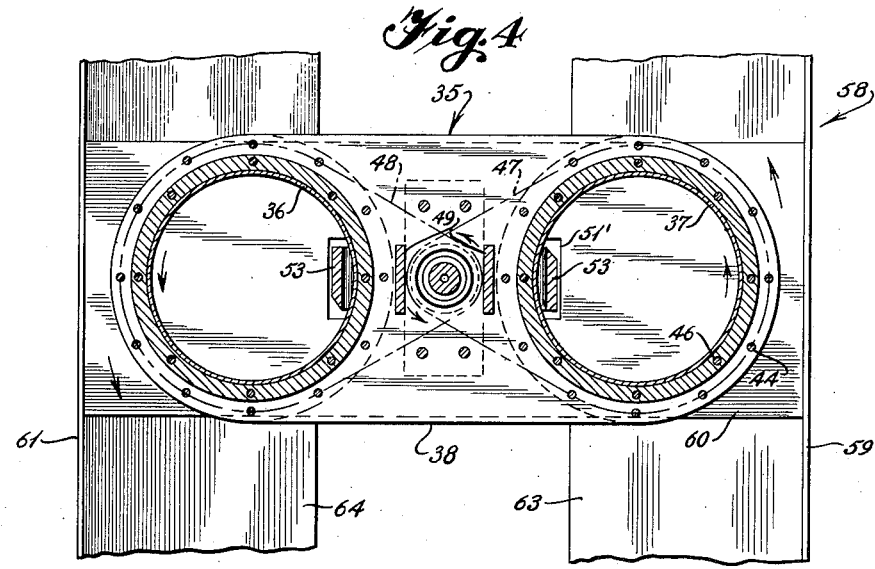
Fig. 4 is a sectional view along line 4—4 of the upper portion of Fig. 3.
Figure 5:
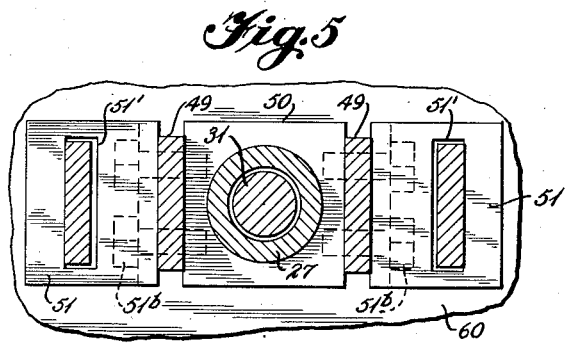
Fig. 5 is an enlarged cross-sectional view along line 5—5 of Fig. 3.
Figure 6:
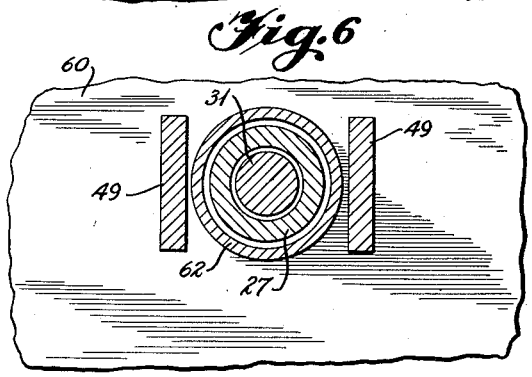
Fig. 6 is an enlarged cross-sectional view along line 6—6 of Fig. 3.
Figure 7:
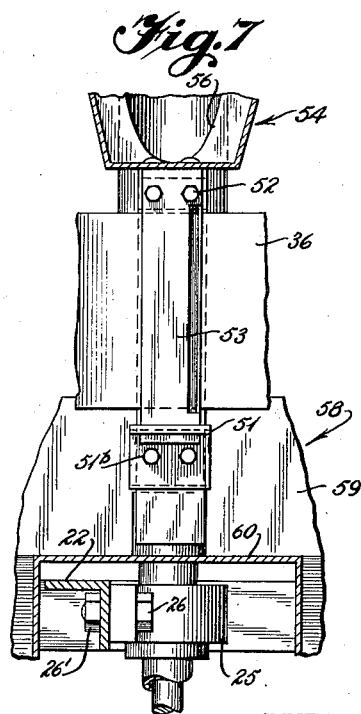
Fig. 7 is an enlarged cross-sectional view along line 7—7 of Fig. 3.

In Fig. 3 each of the drums 36 and 37 are mounted in suitable bearing supports within diametrically disposed apertures in the mounting plate 38. Each of the cylinders 36 and 37 are mounted alike, and there is provided an upper outer bearing ring 40 and a lower bearing ring 41 which have a ball bearing race 42 formed therebetween that cooperates with an inner mounting sleeve 43 which has an offset upper portion or shoulder which rests in the aperture in the plate 38. Suitable ball bearings 42' are mounted in the race 42, and the rings 40 and 41 are secured to the plate 38 by means of through bolts 44 secured by nuts 44'. Cylinders 36 and 37 are formed as truncated cones with inclined inner walls such that the upper end is slightly smaller than the lower end. Attached to the upper end of the inner sleeve 43 is a drum drive sprocket 45 by means of cap screws 46. Sprocket 45 on the driving drum 37 is offset upward so as to be connected by a drive chain 47 to the upper sprocket portion 32' of sprocket 32. Drive chain 48 for the drum 36 is offset downward so that it is in alignment with the lower sprocket portion 32" of sprocket 32. The direction of rotation is typically shown in Fig. 4 for each of the drums 36 and 37 about their axes Y—Y' and Z—Z', respectively, and the direction of rotation of the orbit plate 38 about the vertical axis of the shaft 31. However, the rotation of the drums on their axes may be opposite to their rotation in their bracket mounting. In the illustration, the orbit radius is twice the radius of the drums. The drum speed, in the depicted apparatus, will change from about 120 to about 360 R. P. M. and the orbit bracket 35 will rotate from about 60 to about 180 R. P. M.

Reference to Figures 3, 5, 6, and 7 shows that there is mounted on the orbit bracket 35 to rotate therewith a support bracket 49 at each side of hollow shaft 27 as by means of a mounting plate 50 and angle brackets 51 which are apertured in their upper flanges at 51' to receive scraper bars to be described. The upper ends of the mounting brackets 49 are outwardly turned at 49' and thence turned back upon themselves at 49".

On the return bends 49" there is mounted as by means of bolts 52 downwardly extending scraper bars 53 which serve to scrape the inside surface of each of the respective drums 36 and 37 adjacent which they are positioned while the lower end of the scraper bar 53 is received and held within the aperture 51' of the flange 51.

A feed chute is generally indicated at 54, and it has a central vertically extending open throat portion 55 with downwardly extending spouts 56 which extend into the upper open ends of the drums 36 and 37. Thus, pulverous material to be pelletized which is provided with the proper moisture content before it reaches the pelletizer or by being sprayed with water by means not shown in the machine is introduced in the open throat 55 and down through the spouts 56 into the respective cylinders 36 and 37. In this motion pulverous material is thrown centrifugally outward in the spouts as the pulverous and fluent material moves downward, and thence the pulverous material strikes against the inside of the drums 36 and 37. These drums are rotating and thus roll up the material upon itself and with additional collected material into a hard pellet whose size is dependent upon the type of the pulverous material, the moisture content and the relative rates of speed of the orbit bracket and the respective cylinders. The feed chute 54 is mounted on the bracket 49' by means of bolts 57.

The pelletized material drops downward in the illustration shown in Fig. 3 into a collecting hopper 58 below the pelletizing apparatus. This hopper 58 is attached to the framework and supported therein and comprises a square-shaped receiving pan 59 having a bottom 60 and upstanding sides 61 and an upturned inner portion 62 which fits about the hollow shaft 27. Apertures are formed in the bottom 60 and connect with a chute at each side as indicated at 63 and 64 which leads down through the framework to bottom ends 63' and 64' where the pelletized material is deposited on conveyors or other transferring means.

Figure 2:
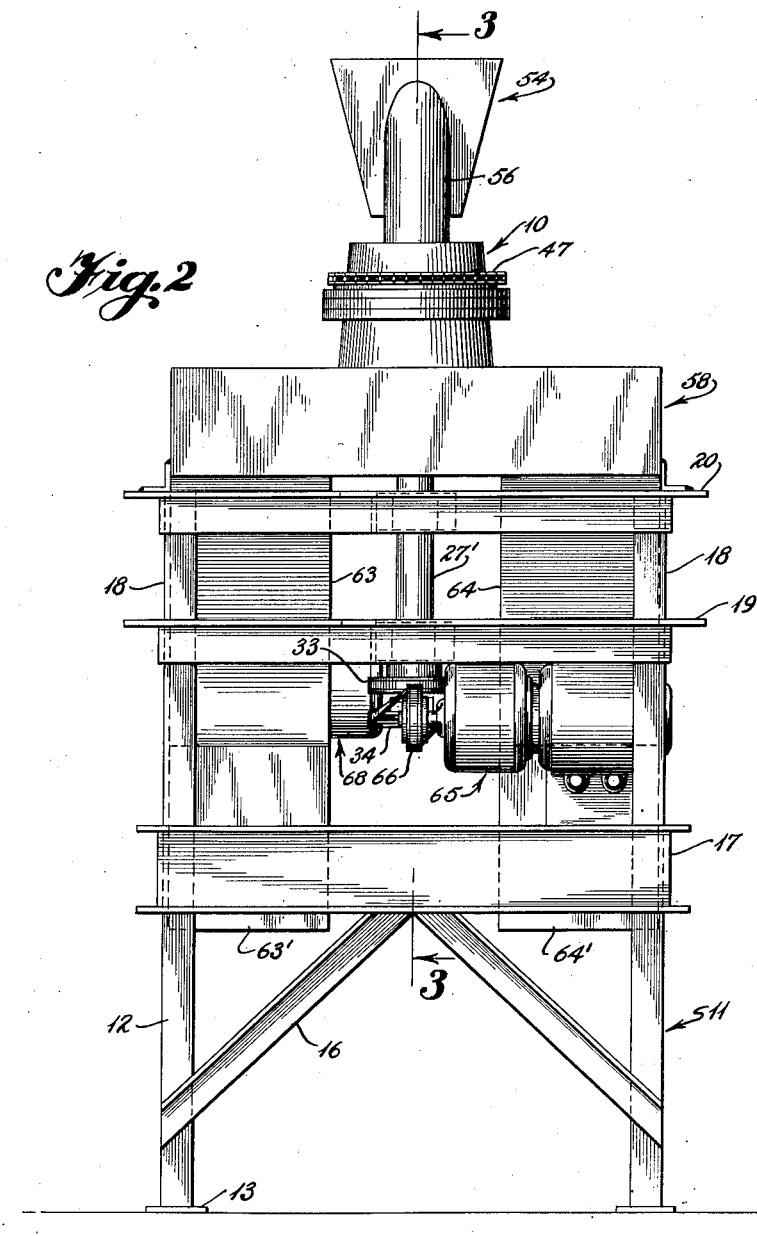
Fig. 2 is a side elevation of the apparatus in Fig. 1.

Mounted on the framework below the pelletizer proper are drive motors and speed reducers as shown in Figures 1, 2, and 3. Hollow shaft 27 is driven by a V-belt 66 leading from a pulley 33 to the drive pulley 65'. Inner shaft 31 is driven by a belt 67 leading from pulley 34 to the pulley 68' on motor and speed changer 68.

An application of this method and means of pelletizing pulverulent material is that as applied to ground fertilizer. This material carries a certain amount of moisture and the moisture content varies with the nature of the material. The degree of moisture content is critical in the production of good pellets and is somewhat critical as to the size of the pellets that can be made. Moisture if not already present when the material is introduced into the pelletizer can be added by a system of sprays (not shown) associated with this pelletizing equipment such as in the pelletizing drums 36 and 37. In a production line for manufacturing fertilizer pellets the fertilizer material as it reaches the pelletizer has a moisture content due to the previous steps in processing and it may happen to have the desired moisture content. Moisture can also be added, if necessary, to the material just prior to its entry into the pelletizer.

The method of pelletizing pulverous material consists of flinging the material centrifugally as would take place, for example, in chute 54 and its branches 56 on further centrifugal movement outward in the drums 36 and 37 where it is intercepted and moved tangentially to the centrifugal direction. At the intercepted location, for example, on the rotating walls of the drums 36 and 37 the material is rolled upon itself and added to form pellets while the forming pellets are also forced centrifugally outward at the same time they are rolled into pellets. Thereafter, the formed pellets drop downward or move on out through the other open end of the intercepting drums 36 and 37.

While I have shown a typical power-driven mechanism including a rotated orbit frame 35 having rotating drums 36 and 37 mounted therein and driven through a certain type of drive means, there are other arrangements of mounting the drums and driving the same as well as for mounting and rotating the orbit frame.

I claim as my invention:

1. A pelletizing apparatus comprising in combination an orbit frame having a central axis, means mounting said frame for rotation about its central axis, means for rotating said frame about said axis, said frame having bearing means therein positioned to one side of said axis, an open ended drum mounted for rotation in said bearing means in said orbit frame and having an axis about which said drum rotates and extending generally parallel to said axis of the orbit frame, a chute structure mounted on said orbit frame for rotation therewith and having an opening at one end for receiving pulverulent material and a discharge opening extending toward an open end of said drum and directing said pulverulent material into said drum, said pulverulent material being flung by centrifugal force outward in its movement through said chute and into said drum against the inner wall of said drum, said material being rolled into pellets by the inside surface of said drum which intercepts the centrifugal movement of the material and directs it tangentially to roll it upon itself and to pick up added material being centrifugally thrown thereagainst by the rotation of said orbit frame and chute about the orbit axis.

2. A pelletizing apparatus according to claim 1 wherein said orbit frame and its mounting means are so positioned that the axis thereof extends vertically.

3. A pelletizing apparatus according to claim 1 having two drums positioned diametrically across from each other about said orbit axis in a dynamically balanced manner and wherein said chute is provided with discharge means leading to each drum.

4. A pelletizing apparatus according to claim 1 having a plurality of open ended drums arranged in dynamic balanced relationship in bearings in said orbit frame and means for rotating each of said drums, said chute structure having branches discharging into each of said open ended drums.

5. A pelletizing apparatus comprising in combination a rotatably mounted shaft, a sleeve mounted for concentric rotation about said shaft, means for rotating said shaft and said sleeve, an orbit frame mounted on said sleeve for rotation therewith and extending radially therefrom, said frame having bearing means therein, an open ended drum mounted for rotation in said bearing means and having its axis of rotation extending approximately parallel to and radially offset from the axis of said shaft and sleeve, means connecting said shaft and said drum for rotating said drum on its axis while it is carried by said orbit frame in an orbit about the axis of said shaft and means for introducing material to be pelletized into said rotating drum whereby said material is flung centrifugally outward against the inner surface of said orbitally rotating drum while the inner wall surface of said drum rotating on its own axis rolls such material particles into pellets as they are forced and compacted against said inner wall of the drum by the centrifugal force.

6. A pelletizing apparatus according to claim 5 wherein said rotatably mounted shaft extends vertically.

7. A pelletizing apparatus according to claim 5 having two drums positioned diametrically across from each other about said orbit axis in a dynamically balanced manner and means for introducing material to be pelleted simultaneously into said drums.

8. A pelletizing apparatus according to claim 5 having a plurality of open ended drums arranged in dynamically balanced relationship in bearings in said orbit frame and means for rotating each of said drums and means for introducing material into all of said open ended drums.

9. A method of pelletizing granular material which comprises the steps of initially propelling the material centrifugally outwardly from adjacent a central axis, intercepting the centrifugal movement of said material and directing it in a direction tangentially to said centrifugal movement and in a circular path about an axis generally parallel to said first axis, said material being carried in an orbital path while being rolled upon itself and upon further adhering material received in the centrifugal propulsion of said further material to form rolled pellets of the material.

10. A method of pelletizing granular material according to claim 9 wherein said central axis about which said material is moved outward centrifugally extends vertically.

11. A pelletizing apparatus comprising in combination a support frame, bearing means attached to said frame, a hollow shaft mounted in said bearings, a central shaft mounted in said hollow shaft and projecting above and below the ends thereof, pulley drive means on the end of said shafts for rotating said shafts, an orbit frame support means mounted on said hollow shaft, an orbit frame mounted on said orbit frame support and extending transverse to said shaft, bearing means mounted on said orbit frame, open ended drums mounted in said bearing means in the orbit frame for rotation on their individual axis extending generally parallel to the axis through said hollow shaft and central shaft, drive means connecting said central shaft and said drums for rotating the same about their individual axis, pulverant material chute means mounted on said orbit frame and having chute portions to direct pulverant material to be pelletized into said open ended drums as they rotate on their individual axis.

12. A pelletizer apparatus according to claim 11 including a scraper member mounted on the orbit frame support and extending along the inside surface of each drum to scrape the adjacent drum surface.

References Cited in the file of this patent

UNITED STATES PATENTS

| | | |
|---|---|---|
| 1,040,373 | Michelsen | Oct. 8, 1912 |
| 2,433,065 | Rubissow | Dec. 23, 1947 |